(12) United States Patent
Schoeneck

(10) Patent No.: US 7,823,366 B2
(45) Date of Patent: Nov. 2, 2010

(54) APPARATUS AND METHOD FOR SELECTIVE PROCESSING OF MATERIALS WITH RADIANT ENERGY

(75) Inventor: Richard Jerome Schoeneck, Alexandria, MN (US)

(73) Assignee: Douglas Machine, Inc., Alexandria, MN (US)

( * ) Notice: Subject to any disclaimer, the term of this patent is extended or adjusted under 35 U.S.C. 154(b) by 1467 days.

(21) Appl. No.: 11/021,976

(22) Filed: Dec. 22, 2004

(65) Prior Publication Data

US 2005/0193690 A1     Sep. 8, 2005

(51) Int. Cl.
B65B 53/02     (2006.01)
B29C 65/16    (2006.01)

(52) U.S. Cl. .................. 53/442; 53/556; 156/272.8; 156/380.9

(58) Field of Classification Search ............ 53/442, 53/557; 156/272.8, 380.9
See application file for complete search history.

(56) References Cited

U.S. PATENT DOCUMENTS

| | | | |
|---|---|---|---|
| 3,222,800 A | 12/1965 | Siegel et al. | |
| 3,349,502 A | 10/1967 | Kiefer | |
| 3,357,153 A | 12/1967 | Shaffer | |
| 3,545,165 A | 12/1970 | Greenwell | |
| 3,545,662 A | 12/1970 | Busler | |
| 3,721,804 A | 3/1973 | Feldman | |
| 3,764,085 A | 10/1973 | Hawkins | |
| 3,830,036 A | 8/1974 | Harkness et al. | |
| 3,847,045 A | 11/1974 | Willhite, Jr. et al. | |
| 3,855,890 A | 12/1974 | Lynch et al. | |
| 3,866,331 A | 2/1975 | Evans, Jr. | |
| 3,897,671 A | 8/1975 | Higgins | |
| 5,010,231 A | 4/1991 | Huizinga | |
| 5,036,739 A | 8/1991 | Clar | |
| 5,050,368 A | 9/1991 | Noh | |

(Continued)

FOREIGN PATENT DOCUMENTS

EP     0 730 944 A     9/1996

(Continued)

OTHER PUBLICATIONS

California Polytechnic State University Website, "Organic Analysis: Infrared Spectrophotometry," on-line publication, printed Sep. 16, 2003 (publication date unknown), 5 pages.

(Continued)

*Primary Examiner*—Stephen F Gerrity
(74) *Attorney, Agent, or Firm*—Alan Kamrath; Kamrath & Associates PA

(57) ABSTRACT

Apparatus selectively processes a substrate using radiant energy. The substrate can consist of any target material having a portion to be processed using the radiant energy and a larger portion to be unprocessed. The apparatus includes a source of radiant energy (preferably a quantum cascade laser) that has a customizable spectrum that can be configured to be specifically absorbed only by the portion to be processed, and a control system for targeting the radiant energy only at the portion to be processed. Specific examples of the use of the apparatus and method are in the technologies of heat-shrinking polyethylene film, fusing toner to paper in a laser printer, heating reaction vessels in DNA testing, and temperature profiling bottle pre-forms.

32 Claims, 5 Drawing Sheets

U.S. PATENT DOCUMENTS

| | | | |
|---|---|---|---|
| 5,259,543 A | 11/1993 | Downing | |
| 5,765,336 A | 6/1998 | Neagle et al. | |
| 5,771,662 A | 6/1998 | Struges et al. | |
| 5,893,959 A * | 4/1999 | Muellich | 156/272.8 |
| 6,207,925 B1 * | 3/2001 | Kendall | 53/170 |
| 6,281,471 B1 | 8/2001 | Smart | |
| 6,340,806 B1 | 1/2002 | Smart et al. | |
| 6,514,448 B1 | 2/2003 | Vogel et al. | |
| D481,049 S | 10/2003 | Limousin | |
| 6,646,669 B2 | 11/2003 | Gelbart | |
| 6,648,634 B2 | 11/2003 | Nava | |
| 6,653,041 B2 | 11/2003 | Payne et al. | |
| 6,654,042 B2 | 11/2003 | Ikeda | |
| 6,672,470 B2 | 1/2004 | Wurster et al. | |
| 6,689,180 B1 | 2/2004 | Liao | |
| 6,749,933 B2 * | 6/2004 | Dries et al. | 156/272.8 |
| 6,772,575 B2 | 8/2004 | Limousin | |
| 2002/0017468 A1 * | 2/2002 | Clay | 53/171 |
| 2002/0179233 A1 * | 12/2002 | Ruotsalainen | 156/272.8 |
| 2004/0123566 A1 | 7/2004 | Limousin | |
| 2005/0000641 A1 * | 1/2005 | Hartmann et al. | 156/272.8 |
| 2005/0155325 A1 * | 7/2005 | Abercrombie, III et al. | 53/401 |

FOREIGN PATENT DOCUMENTS

| | | |
|---|---|---|
| WO | WO 9721550 A1 * | 6/1997 |
| WO | WO 98/08645 A | 3/1998 |
| WO | WO 00/35678 A | 6/2000 |

OTHER PUBLICATIONS

Smiths Detection Website, "Disposable Cards for IR & FT-IR Spectroscopy," on-line product catalog, printed Sep. 16, 2003 (publication date unknown), 1 page.

International Crystal Laboratories Website, "PTFE & Polyethylene IR Sample Cards," on-line product catalog, printed Sep. 16, 2003 (publication date unknown), 2 pages.

Lucent Technologies/Bell Labs Innovations Website. "Bell Labs researchers build novel semiconductor laser using photonic crystal," on-line press release, Oct. 31, 2003, 3 pages.

J. Faist, F. Capasso, C. Sirtori, D.L. Sivco, J.N. Baillargeon, A.L. Hutchinson, S.N.G. Chu, and A.Y. Cho, "Quantum design of QC-laser," Appl. Phys. Lett. 68, pp. 3680-3682 (1996), and index (1 page).

* cited by examiner

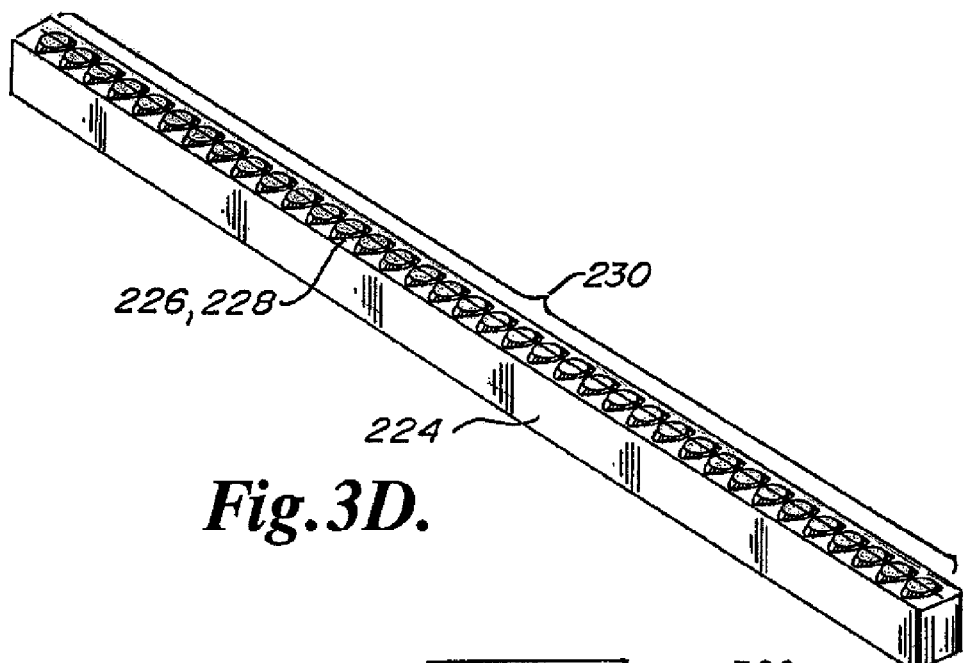
Fig. 3D.
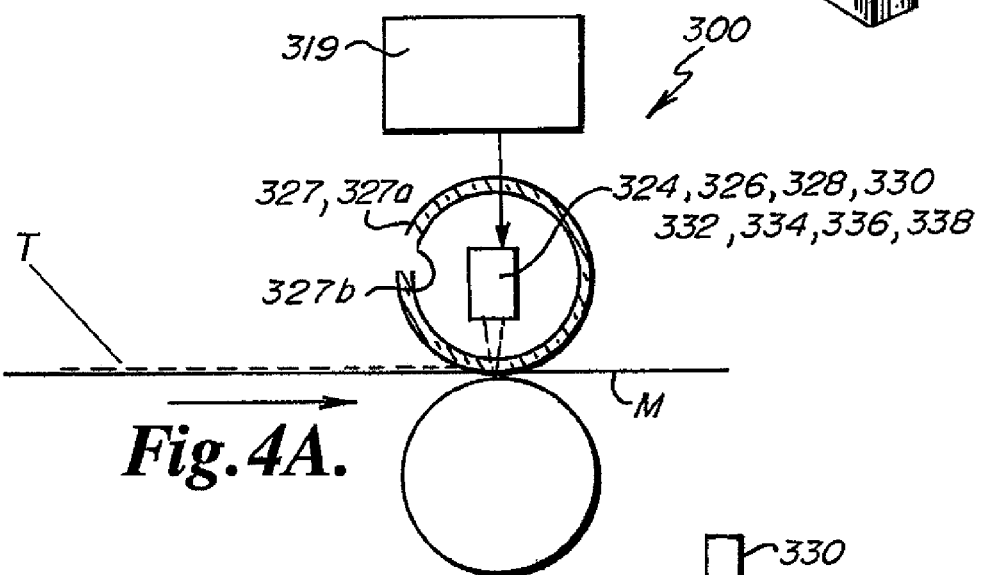
Fig. 4A.
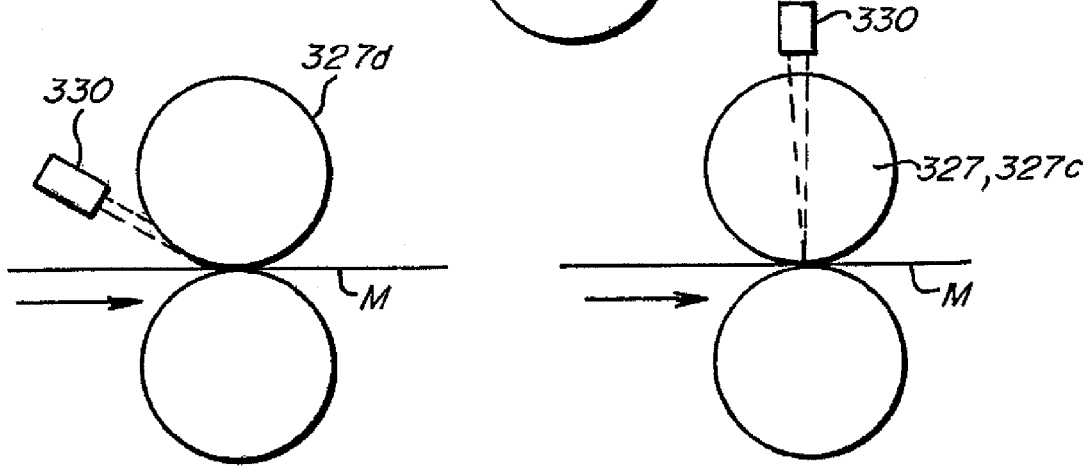
Fig. 4B.          Fig. 4C.

424,426,428,430
432,434,436,438

524,526,528,530
532,534,536,538

APPARATUS AND METHOD FOR SELECTIVE PROCESSING OF MATERIALS WITH RADIANT ENERGY

BACKGROUND OF THE INVENTION

The present invention relates to an apparatus and method for processing materials using radiant energy.

Many items are heated for processing operations. There are three main methods of heat transfer, namely conduction, convection, and radiation. For each of these methods, there are benefits and drawbacks for various materials in various situations. As a background, each of the heat transfer methods are rated on the following criteria: speed, efficiency, controllability of heat transfer rate, and controllability of spatial heat placement. In layman's terms, how fast is it heated, how cheaply is it heated, how accurately is it heated, and how well is the heat placed. The ideal heater is fast, cheap, accurate, and able to place heat accurately.

Speed (Heat Transfer Rate)

1) Conduction is heat transfer through solids. One hot object touches another and quickly transfers heat from the hot object to the cooler object. If the objects are good conductors, the heat will transfer quickly.

2) Convection is heat transfer using a fluid. The fluid properties determine the rate of heat transfer. Hot water can transfer heat quickly because it conducts well, and has a high specific heat. Hot air transfers heat quite slowly. Air is generally an insulator and has a low specific heat.

3) Radiation is heat transfer using electromagnetic energy. This energy travels at the speed of light, so it is the absolute fastest method of heat transfer. However, the target material must absorb this energy. If the material is a poor absorber, either reflecting, transmitting, or re-emiting, it will not heat up. So, the ultimate rate of heat transfer depends upon what fraction of the radiation is absorbed by the material and converted to heat. Additionally, if the radiation is absorbed at the material surface, the subsurface material will be heated through conduction from the material surface.

Efficiency (Cheap to Operate)

1) Conduction. Typically, the hot object has substantial mass in order to build up a store of heat energy. This mass must be maintained at a controlled temperature, and then placed in contact with the object to be heated. The contact time is controlled to obtain the desired amount of heat transfer. The hot object will be continuously giving off heat to the surrounding environment. Insulation can be added to reduce the heat losses. As long as the hot object is hot, there is a heat loss that reduces efficiency.

2) Convection. Typically, the working fluid is heated and contained within an insulated vessel. The vessel and working fluid have mass that provides heat storage. Similar to conduction, the convection system will be continuously losing heat to the environment. Since convection requires a vessel, the volume to be insulated is larger than an equivalent conduction system. With air convection, there can be significant losses of heat as air escapes and products enter the vessel.

3) Radiation. There are several methods of generating radiation. Several have the ability to be turned on and off extremely quickly. The types that can be turned off are more efficient, since no energy is lost while they are turned off. Some radiation generators are inefficient converters, only converting a small percentage of input energy into the desired output energy. The rest of the energy may be in an undesirable form such as waste heat. This may require a cooling system that lowers the overall efficiency. If some waste heat can be used by another part of the process, then, it is not wasted.

Accuracy (of Heating)

1) Conduction. The amount of heat transferred with a conduction system is controlled primarily by two factors. The temperature of the objects, and the contact time. These items may be controlled to a high accuracy. There must be sufficient time after each cycle for the hot item to reheat and stabilize to the levels of the prior cycle. Another variable that may greatly affect the heat transfer is the quality of the contact. If the contact is poor, the amount of heat transfer could be greatly reduced.

2) Convection. The amount of heat transferred with a convection system is also primarily controlled by temperature and contact time. In the case of air heating, the flow dynamics are of significant importance to the quality of the contact between the air and the object. Since airflow is very difficult to control in all situations, the accuracy of heating with air is also very difficult to control.

3) Radiation. Several methods of generating radiation are highly controllable. A laser beam may be pulsed or otherwise modulated to achieve an exacting output of energy. The target material absorbs this energy. If the absorption spectrum of the material is consistent, then, the accuracy of heating will be highly accurate.

Accuracy (of Placement)

1) Conduction. The heat is transferred wherever contact is made. This can be highly controlled by shaping the hot item. (Branding iron). As the contact is maintained, the heat will conduct to the cooler areas of the target material. Since conduction requires physical contact, it can be extremely difficult to construct a mechanism to heat randomly located or moving items.

2) Convection. The heat is transferred by fluid contact. The fluid flow can be very difficult to predict and control. The shape of the target object directly affects the locations of high heat transfer. This makes convection the least accurate for placement.

3) Radiation. Radiation generally travels in perfectly straight lines. As it encounters materials, it may be reflected, diffused, focused, or absorbed. In the case of a laser beam, the radiant energy may be controlled with extreme precision.

When reviewing the previous criteria, radiation has the potential to be the fastest, the most efficient, and the most accurate for heat transfer and heat placement. Because of all these benefits, there is a great need to develop a low cost system that can meet all these criteria. The primary obstacle to using radiation is the absorption spectrum of the target material not matching the spectrum of energy being generated. A second obstacle is the added cost of a control system required to make this type of system perform well. The control costs are primarily associated with the mechanisms needed for accuracy of heating and accuracy of placement.

The present invention relates to using radiant heat to process various materials in various applications. The following examples, while instructive of the concepts and implementations involved, should not be viewed as exclusive.

Example 1

Heat Shrink Tunnel Using Radiant Heater instead of Air Convection Heating

It is known in the art to overwrap articles in a web of heat shrinkable film to form a multipack package by separating a tube of such film wrapped around spaced groups of articles along a weakened zone by shrinking the tube adjacent the zone and then by shrinking the tube section formed thereby around the articles to form a package. See U.S. Pat. No. 3,545,165.

Previous methods of packaging such as the above have involved feeding the groups of articles into a heat tunnel in series, with the film wrapped around the articles from the leading edge of the group to the trailing edge of the group. Groups of articles are placed spaced apart on a conveyor. A layer of film (usually from a roll of film) is wrapped around the groups with the film layer continuously covering adjacent groups.

The groups are then fed on the conveyor into a heat tunnel. Heat and (typically) forced air is applied to the junction between adjacent groups, causing the film layer to soften at the junction and pinch off between the groups, at the same time shrinking tightly against the groups. This results in complete packages of articles, with the film shrunk about them. The closed ends of the packages (known as "bulls eyes") are at ends of the packages in the direction of travel of the conveyor.

In the packaging industry, aesthetics has become an increasingly important issue, both for the package that is produced and the machine that produces it. When the film is shrunk around the end of a package, it should leave a circular opening, the "bulls eye", and should be free of wrinkles. This should be consistent from package to package and over a variety of product sizes.

Many of the challenges in producing aesthetically pleasing "bulls eyes" stem from the way that current heat tunnels operate using convection heating. Current heat tunnels often produce deformed bulls eyes due to uncontrolled airflow. That is, as the group of articles enclosed in shrink-wrap film enters the heat tunnel, the film is subjected to various disruptive air currents, causing the film to flutter as it is shrunk. This uncontrolled airflow results in the film wrinkling and shrinking non-uniformly, which in turn results in unaesthetically pleasing bulls eyes. Furthermore, current heat tunnels are not generally adjustable for various product sizes.

There is a need for a new heat tunnel capable of consistently good bulls eyes with controlled shrink and that is adjustable for a range of product sizes.

There is also a need for a new heat tunnel to reduce the heat transfer to the outer skin of the heat tunnel, increasing the operating efficiency and improving the working environment around the machine by lowering the temperature.

There is also a need for a more aesthetically appearing heat tunnel, and one of reduced size.

The function of 'shrinking' is basically heating the film to the point where the stresses are released. The film reverts back to it's former size. Shrink film may be thought of as a rubber band which has been stretched and then frozen. Heating allows it to relax.

The function of 'welding' is heating adjacent films to the point where intermolecular bonds are formed between the films. Shrink film will weld at a lower temperature than it will shrink. Welding often requires some slight contact pressure to assist the molecular bonding.

The function of 'cutting' is heating film to the point where it melts or vaporizes and separates from the adjacent material.

All of the above needs are addressed by the present invention, which uses radiant heat instead of convection (hot air) to perform film-shrinking on packages.

One example of the way in which radiant heat can be used in heat shrinking plastic film is to use a laser beam with a wavelength that is adjustable to match the absorption spectrum of the film. Such a laser has been developed by Bell Laboratories as the Quantum Cascade (QC) laser.

Plastic films such as polyethylene absorb infrared energy in only a few regions of the IR spectrum, mainly narrow regions at about 3.5, 6.9, and 13.6 to 14 microns wavelength. The rest of the spectrum passes through the film and therefore does not heat the film, but rather heats other objects beyond the film.

Traditional infrared heat sources emit a broad spectrum of IR energy. This causes undesirable effects of heating the products and surrounding structure, with a very small fraction of energy absorbed by the plastic.

Typical infrared lasers such as $CO_2$ lasers also emit a broad spectrum of IR energy making them impractical for shrinking film.

The quantum cascade (QC) laser developed recently by Bell Laboratories can be designed to generate a custom infrared spectrum. The quantum cascade laser can be developed to emit a spectrum specifically designed to match the absorption spectrum of polyethylene plastic. The technology is low cost, high power, and solid state, all very desirable characteristics for a heat source.

Example 2

Fusing Roller Using Radiant Energy

Laser printers and copy machines currently use heated fusing rollers to bind toner to the page. In this description, copying and printing are referred to as 'printing'. This heated roller has several drawbacks. It takes time to heat up causing delays before the first page can be printed. To shorten the delay, the roller may be kept warm. This wastes electricity and requires a cooling fan to keep the printer from overheating while not in use. When printing at high speed, the fusing roller may be the limiting factor due to its limited heat transfer rate. The roller also heats the entire page when only the regions with toner need to be heated. The power available from most AC power outlets becomes an upper limit to using more powerful fusing rollers in fast printers and copiers. The present invention relates to a radiant heat source that overcomes all of these limitations.

U.S. Pat. No. 6,653,041 discloses a method and apparatus for fusing toner to a laser printed page using UV-sensitive toner and a UV light source. However, the UV light is directed indiscriminately at the page, rather than only to areas on the page where toner is present.

Example 3

DNA Reaction Vessel Heating Using Radiant Heater Array

When processing DNA tests, various samples of DNA are placed in reaction vessels. Various reagents are added in various combinations to the samples. Typically, the reaction vessels are arranged in an array allowing many combinations of samples and reagents. Each of these combinations is designed for a specific test type. Some samples must be heated with various heat cycles to cause the reaction to take place. Some samples may not require heating or may require heating to a different temperature depending upon the type of test being performed. The current method is to place the reaction vessels in a hot water bath. This is convection heating with water. It takes time for the heat to transfer through the plastic reaction vessel. Another drawback with the water bath is the mess and inconvenience of getting the reaction vessels wet and the loading and unloading. If one of the vessels leaks, the water bath could be contaminated. Working with hot water can cause burns. The present invention relates to a radiant heat source that overcomes these limitations.

Example 4

Temperature Profiling Bottle Pre-Forms

Manufacturers generally make bottles from a relatively hot pliable parison or pre-form using one of several well-known process technologies for making, heating or re-heating the pre-form, and forming the pre-form into a bottle. Air pressure inflates this hot pliable pre-form against a relatively cool cavity surface within the blow-molding tool to form the bottle configuration having approximately the same surface area and shape. However, a long-standing problem has existed in the manufacture of bottles that do not have a circular cross-section. With pre-forms that are to be made into bottles having rectangular or oval cross-sections, it is difficult to achieve uniform wall thickness. If uniform wall thickness is not achieved, particularly in the base of the bottle, the base may have distortions that can cause the bottle to rest unevenly on a surface and even tip over. Various techniques, such as heat-profiling, have been used in order to attempt to solve this problem. However, they have not been very successful, particularly in the area of the pre-form closed end, because it has not been practical, because of the small size of the closed end, to heat profile sub-regions within the closed end. U.S. Pat. No. 6,672,470 discloses a process of forming a bottle by using a mold with standing rib-like projections. However, not only does this require a special mold, but the resulting bottle has unusual rib-like grooves in its base. Furthermore, the temperature profiling process used in the past, as illustrated by U.S. Pat. No. 6,514,448, has required very complex mechanical systems and a number of radiant heaters and coolers.

As the pre-form expands, the plastic wall will become thinner. The more it stretches, the thinner it gets. The material stretches according to viscosity and interaction with the mold. This process creates a problem of controlling the uniformity of the wall thickness. One main method used to control wall thickness is to control the material viscosity just before it is expanded. This is achieved through a process known as heat profiling where different regions of the pre-form are heated to different temperatures.

Warmer regions will have a lower viscosity. They will stretch more easily and therefore end up thinner than cooler regions. Regions that contact the surface of the mold first typically stop thinning while the regions still expanding thin at an increasing rate as more material grips the mold wall. When the bottle shape is cylindrical, with a generally round cross section, the heating can be uniform around the circumference, but may be varied along the axis. When the final bottle shape has an elliptical or square cross section, the corner regions of the pre-form will be heated less because that material would stretch too thin if heated to the same temperature as the faces. The heat profiling of the pre-form is a major factor in controlling the wall thickness of the final bottle.

The wall thickness is very important for the strength of the bottle. If the wall thickness can be more accurately controlled, non-structural regions could be made thinner saving material cost. Several methods of heat profiling currently exist. Most use a handling mechanism that rotates and positions the pre-forms adjacent to heating and cooling elements. In general, the regions that require more heat are exposed to more heating and/or less cooling. The heating elements are usually infrared lamps. The cooling elements are usually air blowers. Various shades or apertures can be used to block portions of the infrared heat.

The heat energy is difficult to accurately place using these methods. These methods of heating the pre-form are difficult to adjust and get 'dialed in' for consistent wall thickness control. With these designs, the time to heat profile the pre-form is slow enough so that a hot region will conduct some heat into an adjacent cooler region. This has the effect of blurring the desired heat profile. Also with current designs, it is very difficult to control the heating of the base of the pre-form since it is a smaller region, and is positioned at the end.

The bottle base is often the most critical region for structural strength since the product weight will be concentrated at the base. The base also could benefit the most from heat profiling due to the great variation in stretch lengths in such a small area. The center of the base or the push-up region often remains very thick. The thick plastic does not cool as fast and can lead to distortions of the base when prematurely removed from the mold when running at higher speeds.

By using a source of radiant heat that is specifically absorbed by the plastic of the bottle pre-form and targeting the radiant energy only at the areas of the bottle pre-form that are to be heated during the temperature profiling process, the present invention solves the long-standing problem of pre-form temperature profiling without the need for complex mechanical systems. The accuracy of the invention allows specific problem areas of the bottle pre-form, such as the base, to be accurately temperature profiled.

SUMMARY OF THE INVENTION

Apparatus selectively processes a substrate using radiant energy. The substrate can consist of any target material having a portion to be processed using the radiant energy and a larger portion to be unprocessed. The apparatus includes a source of radiant energy that has a customizable wavelength that can be configured to be specifically absorbed only by the portion to be processed, and a control system for targeting the radiant energy only at the portion to be processed. Specific examples of the use of the apparatus and method are in the technologies of heat-shrinking polyethylene film, fusing toner to paper in a laser printer, heating reaction vessels in DNA testing, and temperature profiling bottle pre-forms.

Heat Shrink Tunnel Using Radiant Heat

In one aspect, this invention discloses a novel heat shrink tunnel using radiant heat instead of air convection heating. In this application, the substrate is polyethylene shrink film. Particular areas of the shrink film are irradiated with radiant energy of a wavelength which is absorbed by the shrink film, with most areas of the shrink film not being irradiated.

The present invention has the following advantages when used in an apparatus for heat shrinking plastic film.

A principle object and advantage of the present invention is increased speed.

The current industry standard for heating shrink film is to use hot air convection heating. Air has a low heat capacity, thus, requiring large volumes of hot air be passed across the film surface to convey enough energy into the film. Air is a good insulator. Of the volume of air passing over the shrink film, heat transfers only from the small fraction of air that is able to contact the film. The air that is a fraction of an inch away from the film does not transfer heat into the film. This becomes a problem of airflow management to maximize the contact of the volume of airflow with the film.

Using very hot air can cause burn thru or darkening in some spots while other areas are not heated enough. This puts an upper limit on air temperature, thus, requiring larger volumes of air to transfer the same quantity of heat. A high temperature may also overheat the outer surface of the film while the inner surface is cooler affecting the strength of the film.

Because of these limitations of air heating, it takes some time to transfer the required heat energy into the film to cause it to shrink.

Radiant heat energy travels at the speed of light. Radiant energy can be focused on the film at very high wattages. The rate of heating is not limited by the deficiencies of air. A high rate of heating requires much less time that increases the speed of shrinking.

Another principal object and advantage of the present invention is increased efficiency.

With air heat, the hot air continually heats other non-desirable surfaces. The air must be contained and continually recycled. This also heats the structure of the shrink tunnel. These structures are insulated. However, they continually leak away energy into the surrounding environment. Since packages must enter the shrink tunnel, a significant amount of hot air escapes as each package enters and exits the shrink tunnel again adding to the heat losses.

The air also heats the conveyor carrying packages through the heat tunnel, and it loses a significant amount of heat as it repeatedly enters and exits the shrink tunnel. The products inside the shrink film are also heated. This is not desirable since they must be cooled as they are processed further. All of these heat losses increase electricity costs both in direct losses as well as adding to the cooling costs of the building.

The source of radiant heat can be turned on and off quickly for each package. There will be no heat loss during the time when the source is off.

With radiant heat, air is not heated. Not even the products are heated. Just the film is heated and, then, only at specific locations. This will be a very significant reduction in operating costs. With radiant heat, infrared reflective materials, such as LASER GOLD™ material, can be used on the inside of the shrink tunnel. This will reduce heating of the tunnel structure.

Another principle object and advantage of the present invention is increased accuracy of heating.

Air heat also heats all of the structure inside a shrink tunnel. This thermal mass currently requires about thirty minutes to heat up or cool down. This delay requires machine operators to preheat the tunnel before running the machine. It also causes a delay if they need to maintain it. Radiant heat will turn on and off for each package. This will require no heat up time or cool down time. Since the surrounding air is not heated, the thermal mass will not be heated or cooled. The radiant heat source will preferably be pulsed as the package passes. As the package speed increases, the same number of pulses will be used, but they may just occur at a higher rate.

With air heat, turbulence and other factors make it difficult to direct the heat into specific regions of the film. It is a very complex and dynamic airflow problem. With radiant heat, the heat can be applied to exacting regions of the film. It is basically an optics issue to direct the beam of energy exactly where you want it. Package graphics and other regions where distortion is undesirable could be avoided.

Another principle object and advantage of the present invention is accuracy of placement.

With air heat, the high volume of air required causes flapping and wrinkling problems that degrade the package appearance. With radiant heat, airflow can be managed, if needed, to assist rather than hinder the shrinking process. Airflow may not be needed. The radiant energy can be applied to specific regions in a sequence to help prevent wrinkles. One could also create unique effects such as ridges, dots, lines, or other 3D textures. With radiant heat, the application of heat will preferably be exactly the same from package to package. This will provide consistency of quality.

In lap welding, hot air technology welds the film lap under the package by directing a lot of hot air at the entire bottom of the package. The air passes through holes in the conveyor chain carrying the package. This disturbs the side air streams and also requires a lot of power. Radiant technology will be able to heat just the lap portion by illuminating the lap region exposed through the chain links or from the top. This should efficiently weld the lap portion that is beyond the package. A good weld in this region is critical to a well-formed bull's-eye and package quality. One could even weld in the form of a logo or other graphic as an advertising effect.

Fusing Roller Using Radiant Energy

In one aspect, this invention discloses a novel apparatus and method for fusing toner on a print medium such as paper using radiant heat. Other print media such as transparencies may also be used. "Toner" as used here is defined as any substance applied to the print medium that can absorb the radiant energy.

The present invention has the following advantages when used in an apparatus for fusing toner to a print medium using a radiant heater array.

A principle object and advantage of the present invention is increased speed.

The current industry standard for fusing toner uses a heated roller for conduction heating. This roller is typically a covered roller with a heating element at the center. The thermal mass of the roller must be brought up to operating temperature before printing can start. This warm-up delay is an inconvenience and delays delivery of the first page. Once printing has started the fusing roller cover has a limited rate of conduction. This rate will limit the maximum printing speed. A more powerful heating element is not always possible because of the limited power available from a standard AC outlet. This limits the maximum printing rate.

In the present invention, a fusing roller that is transparent to the radiant energy is used. The fusing roller may also be designed to be thermally insulating instead of thermally conductive. A radiant energy emitter bar may be positioned at the center of the roller and aimed toward the page as the fusing roller presses it. (Alternately, the roller could act as a lens by focusing the radiant energy at the contact point. This would allow the radiant heater array to be positioned outside the roller.) The radiant heater emitter bar consists of an array of individual radiant energy generators. The spectrum emitted by the generators is customized for maximum absorption into the toner and minimal absorption into the page. By limiting the heating to mainly the toner, the wattage required is greatly reduced. The paper or other print medium is mostly not heated. This will cause the page to exit at a cooler temperature and also set the toner faster by using the page and the roller surface to cool the toner to the lower temperature. This reduction in energy required will allow a faster printer with a limited power supply.

Radiant energy can be focused on the toner at very high wattages. The rate of heating is not limited by the thermal conduction of the roller.

The printing process can be started immediately. There is no warm up delay.

The emitter bar elements can be selectively energized to only heat the page where toner is present. The digital image in the printer memory is used to control the emitter elements. A copy machine could utilize a line scanner just prior to the fusing roller to capture the digital image.

The selective heating makes a very high print rate possible. The typical office power outlet can only provide a limited amount of power. By selectively heating the page, typically just 5 to 10 percent of the page will be heated lowering the heat required by a factor of 10 to 20.

Another principal object and advantage of the present invention is increased efficiency.

In previous fusing rollers, the heated roller continually wastes heat. A cooling fan is required to remove the waste heat. The structure around the fusing roller can be insulated. However, it continually leaks away energy into the surrounding environment. To avoid the warm-up delay at the start of printing, the heated roller is maintained at a medium temperature. This continually wastes electricity while the printer is not in use. The fusing roller also heats the entire page when typically only 5 to 10 percent of the page area has toner. The fusing roller heats the paper as well as the toner. This requires much more energy.

In the present invention, the fusing roller does not have to remain heated, saving electricity. The radiant heater shuts off between pages saving electricity. The fusing roller remains cool removing the need for the cooling fan. Only 5 to 10 percent of the typical page area is heated, saving electricity. Mainly, the toner is heated instead of the paper, saving energy. Since the printer uses less energy overall, the office space will remain cooler. This will also reduce the energy used for air conditioning.

Another principle object and advantage of the present invention is increased accuracy of heating.

In previous fusing rollers, as multiple pages are printed, the fusing roller will stabilize at some temperature cooler than the heating element that is heating it. This causes variations in fusing roller temperature at the surface in contact with the toner. The roller temperature is set sufficiently hot to prevent fusing failures. If the fusing roller becomes dirty, the rate of heat transfer can be reduced. The current method of sensing the roller temperature is a sensor that rides on the surface of the roller. If this sensor malfunctions by becoming dirty or insulated by debris, the roller may become overly hot to compensate for the cooler temperature reading.

In the present invention, modulating each emitter controls the exact energy needed to heat the toner. A heavy paper or transparency will not affect the heating of the toner, since the radiant energy heats the toner much faster than conduction into the media.

Another principle object and advantage of the present invention is increased accuracy of placement.

Previous fusing rollers heated the entire page and continuously lost heat to the atmosphere. The fusing roller heated the printer mechanism and ultimately the office space.

In the present invention, the radiant heater only heats the printed areas of the page, resulting in savings of 10 to 20 times. The radiant heater only heats the toner, leaving the majority of the page material cool.

DNA Reaction Vessel Heating Using Radiant Heat

In one aspect, this invention discloses a novel apparatus and method for heating a reaction vessel containing a liquid having DNA therein using radiant heat.

The present invention has the following advantages when used to heat DNA using radiant heat.

A principle object and advantage of the present invention is increased speed.

A current method for heating DNA test samples is a hot water bath. The DNA sample and reagents are added to a plastic vessel. The vessel is placed in a hot water bath and left to soak until the samples have reached the correct temperature. The thermal mass of the plastic reaction vessel must be brought up to the correct temperature before testing can continue. This warm-up delay is an inconvenience and reduces the speed of the testing. The loading and unloading of the samples is an inconvenience that takes additional time.

In the present invention, a radiant energy emitter bar is positioned below the plastic reaction vessel array. There is very little warm-up delay.

Another principle object and advantage of the present invention is increased efficiency.

In previous designs, the heated water bath continually wastes heat. The water bath heats the entire test vessel.

In the present invention, the lower portion of the test vessel is heated instantly and directly, saving electricity. The radiant heater shuts off between vessels saving electricity.

Another principle object and advantage of the present invention is increased accuracy of heating.

In previous designs, as the water bath is maintained at a fixed temperature, the heating of the sample will follow the heating cycle of the conduction through the vessel wall.

Different tests that require different reaction temperatures will require different water bath temperatures. The rate of heating of the test sample will be slower with a cooler water bath. The ability to precisely customize a heating profile is limited by the conduction rate of the vessel. There is a practical limit of maintaining multiple water baths in a limited laboratory space. The control system for each water bath temperature will have to be very accurate to ensure consistency from bath to bath and lab to lab.

In the present invention, modulating each emitter controls the exact energy needed to heat the test sample. The number of unique heating profiles is virtually unlimited. The emitter modulation pattern can be optimized for each test type. This will provide better 'customized' reactions with highly repeatable results.

Another principle object and advantage of the present invention is increased accuracy of placement.

In previous designs, the hot water bath heats the entire vessel and continuously loses heat to atmosphere.

In the present invention, the radiant heater only heats the desired area of the test vessel.

Bottle Pre-Form Temperature Profiling

In one aspect, this invention discloses a novel apparatus and method for temperature profiling and molding bottle pre-forms.

A principle object and advantage of the present invention is increased speed.

The bottle pre-forms may be loaded into a heating mechanism. A preferable method would be to position the pre-form inside the mold prior to heat profiling. This would eliminate the external heat profiling mechanism.

With proper heat profiling of the bottle push-up region, the plastic is much thinner than with current technology. This will cool much quicker, allowing the mold to be opened sooner, shortening the cycle time per mold cavity.

Another principal object and advantage of the present invention is increased efficiency.

The laser design provides for heat profiling with the extrusion type blow molders. The pre-form is hot as it is extruded, removing the need for reheating. This saves energy. The pre-form is heated instantly and directly, saving electricity. The radiant heater shuts off between cycles saving electricity.

Another principal object and advantage of the present invention is increased accuracy of heating.

Modulating each emitter controls the exact energy needed to heat the pre-form. An analysis of the wall thickness of test bottles will allow the heat profile to be precisely modified to quickly zero in on an optimal heat profile. This profile can be saved in a computer and recalled for future use. This will provide an exact and repeatable heat profile for many various bottle shapes. The number of unique heating profiles is virtually unlimited. The emitter modulation pattern can be optimized for each bottle type. This will provide better 'customized' heat profiling with highly repeatable results. Since the heat profiling can be performed while the pre-form is inside the mold, the time delay from heating to blowing will be very short. This will minimize any blurring of the heat profile due to adjacent material conduction or ambient air convection cooling.

Another principal object and advantage of the present invention is increased accuracy of placement.

The radiant heater emitter bar preferably consists of an array of individual radiant energy generators. Adjacent beams are parallel. Furthermore, the present invention permits the pre-form to be heated while it is in the mold. The mold opens like a book. With the present invention, the blow molding equipment can load the pre-form into the mold and leave the mold slightly open. The source of radiant energy is then aimed at the pre-form through the opening. As the pre-form is rotated, the present invention ensures the correct orientation with the mold, because there is no hand-off from a heating line to a blow-molding line. This is especially important for pre-forms with a non-circular cross-section.

An additional benefit of the invention is that the mold can also act as a shield for the radiant energy, preventing the radiant energy from being scattered into the environment.

Another benefit of the invention is the short time from heating to blow-molding. With current technology, the hot regions of plastic will conduct heat to adjacent cooler material. This tends to even out or blur the temperature profile. The longer it takes to transfer from heating to blow-molding, the less distinct is the heat profile. By placing the pre-form in the mold, a much more distinct temperature profile is possible. This could allow new bottle designs not possible with the current technology.

Another feature of the present invention that will be beneficial is that the radiant energy beam may be tuned to be slightly off from an exact match to the pre-form plastic. This will allow a portion of the radiant energy to penetrate into the deeper layers of the pre-form. This will greatly speed up the heating time. It would also be possible to design a radiant energy spectrum to have a certain percentage of the energy tuned for the surface, and the remaining percentage tuned to penetrate. This would cause more heating on the outer skin, which may provide benefits for bottles with fine textures.

It is important to note that the extrusion blow molding process does not typically use heat profiling. This is because the hot plastic is often extruded directly into the mold cavity, thus, preventing the heat profiling as practiced today. The extrusion process has traditionally adjusted the extrusion cross section to match the final bottle shape. The heater technology described here could easily be adapted to provide heat profiling to extrusion blow molding. This could make extrusion blow molding a better technology than injection blow molding and stretch blow molding since the plastic does not need to be reheated. It would seem that the evolution of the reheat blow molding technology was required mainly to accommodate the heat profiling process external to the mold cavity. It should be understood that the descriptions of the current technology apply mainly to reheat blow molding, while the Radiant laser array design can be applied to all forms of blow molding.

BRIEF DESCRIPTION OF DRAWINGS

FIG. 3D is a detailed schematic of an emitter bar of the present invention.

FIGS. 4A-4C are schematics of a fusing roller using the present invention to fuse toner onto a print medium such as paper.

DETAILED DESCRIPTION OF THE PREFERRED EMBODIMENTS

Figure 1:
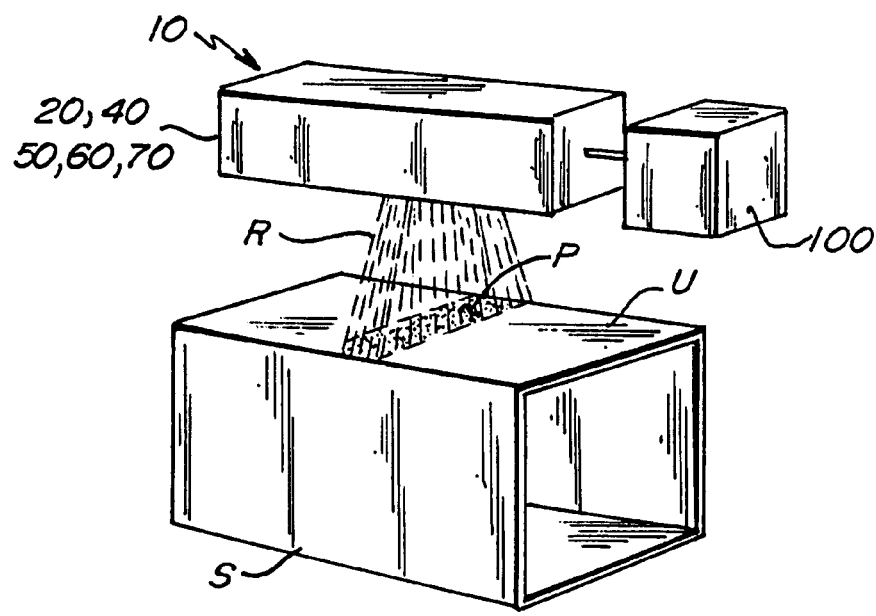
FIG. 1 is a general block diagram of the present invention.
Figure 3A:
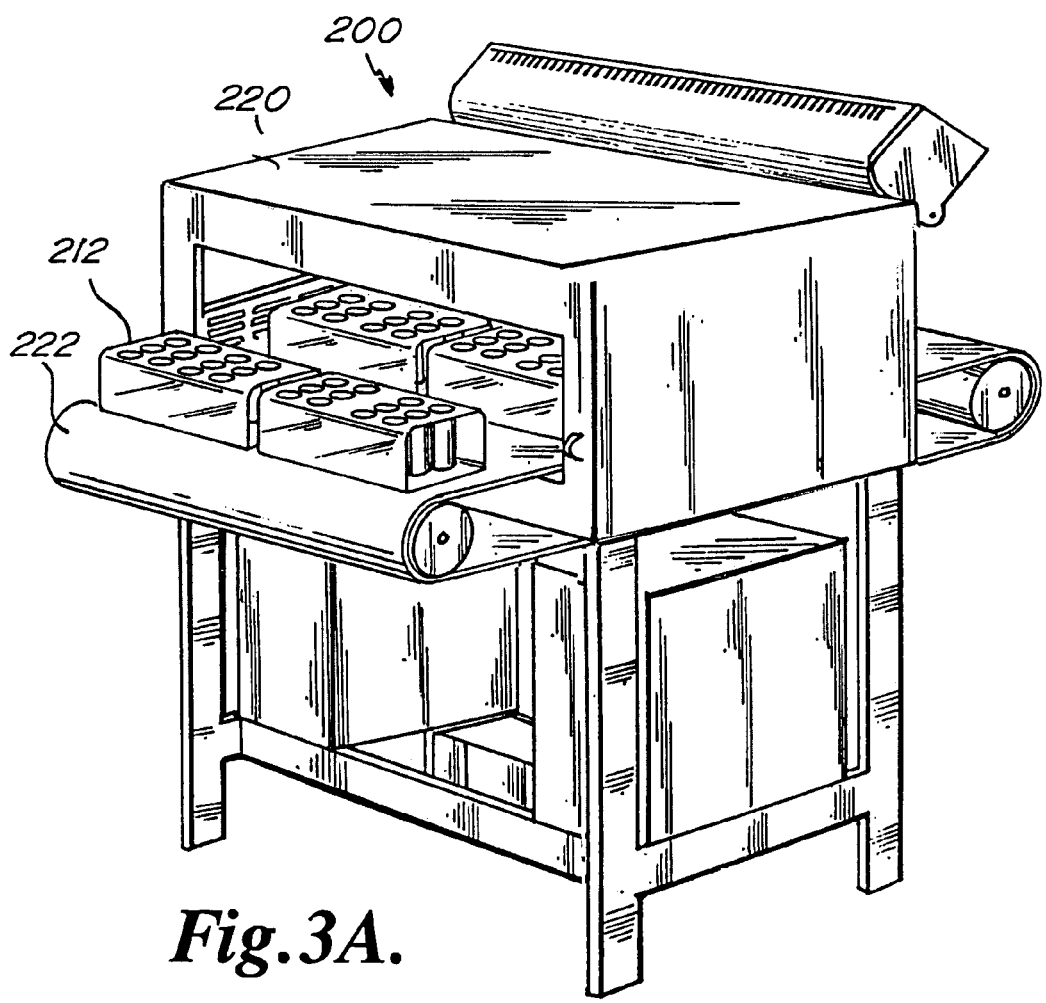
FIG. 3A is a schematic of a heat tunnel using the present invention of shrinking polyethylene film onto articles.

In general terms, as shown in FIG. 1, the present invention comprises an apparatus 10 for selective processing of a substrate S using radiant energy. The substrate S has a portion P to be processed and a larger portion U to be substantially unprocessed.

The apparatus 10 further comprises a source 20 of radiant energy R having a customizable wavelength $\lambda_c$ or spectrum of wavelengths $\lambda_{c1}$, $\lambda_{c2}$, adapted to be configured to be specifically absorbed by the portion P to be processed and to substantially unabsorbed by the portion U.

In one embodiment, the source 20 of radiant energy R is a quantum cascade laser 40. Preferably, the quantum cascade laser 40 is configured to emit infrared radiation. Alternatively, the quantum cascade laser 40 is configured to emit visible radiation as a guide for alignment and verification of operation. Alternatively, the quantum cascade laser 40 may be configured to emit ultraviolet radiation.

The QC laser, invented at Bell Laboratories in 1994, is based on one of type of carrier (electrons) making transitions between energy levels created by quantum confinement. In conventional semiconductor lasers, including the so-called quantum-well lasers, negative and positive charges (electrons and holes) are injected into the active layer and annihilate each other, releasing energy in the form of light quanta, or photons.

The energy of these photons, and the corresponding wavelength, are determined by the bandgap of the active-layer material. The bandgap is the energy difference between a band of energy levels occupied by the injected electrons (conduction band) and a lower band occupied by the injected holes (valence band). As such, it is a fundamental property of the semiconductor material.

To substantially alter the emission wavelength, therefore, one must build a laser with a different semiconductor. For example, near-infrared diode lasers used in fiber-optic communications are made of different materials than are semiconductor lasers used for CD players, which emit light at shorter wavelengths.

By contrast, the QC laser is a unipolar semiconductor laser: only one type of charge (electrons) is needed for its operation. The electrons jump between two well-defined energy levels in the conduction band of the active-layers (quantum wells) and in doing so emit photons of energy equal to the energy difference between these levels.

This energy, which determines the wavelength of the emitted light, is controlled by the thickness of the quantum wells and the height of the energy barriers confining the electrons to these active regions (quantum-confinement or quantum-size effect). As a result, the wavelength is entirely fixed by quantum effects and can be continuously tailored over a very wide range by simply changing the active-layer thicknesses while using the same combination of semiconductor materials.

These materials are alloys grown on gallium-arsenide and indium-phosphide substrates and are used in high-speed transistors and lasers for telecommunications.

Because of their larger energy bandgap and more mature technology, QC lasers are much easier to process, less prone to defect formation and more reliable than low-bandgap semiconductors such as lead salts and indium-arsenide, indium-antimonide-based alloys used for conventional mid-infrared diode lasers.

In quantum-well lasers used in fiber-optic communications, the wavelength is partly determined by the thickness of the active layer and partly by its material composition (i.e., by its bandgap). As such, the wavelength can be tailored over a much smaller and different range (from the visible to the near-infrared) than in QC lasers, by varying the layer thicknesses.

The energy level structure of QC lasers strongly resembles the four-level scheme of many atomic and solid-state lasers. Lasing takes place between two excited states, of which the higher one is full of electrons while the lower one is empty. This state filling and emptying, called population inversion, is essential for laser action and was achieved by tunneling, a counter-intuitive quantum-mechanical process by which electrons can traverse ultrathin (nanometer-thick) barriers even when they have an energy too small to surmount it.

In the QC laser, the multilayer material, including the quantum-well active regions, consists of alternated nanometer-thick aluminum-indium-arsenide and gallium-indium-arsenide layers grown by molecular-beam epitaxy on an indium-phosphide substrate.

The spectrum of the QC laser can be tuned to precisely match the absorption spectrum of the target substrate. Other lasers will need a spectrum modifier to perform this task.

The goal of the spectrum modifier is to take the spectrum of the laser and either filter it or convert it to match the absorption spectrum of the target material. The specific laser technology does not emit the spectrum desired, so the spectrum must be modified. A spectrum modifier may be a combination of optical elements including filters, up-converters and down-converters.

Many types of filters could be used to modify the spectrum. For example, and without exclusion, filters are available at Barr Associates, Inc., 2 Lyberty Way, Westford, Mass. 01886.

A filter does not add to the spectrum, but only removes parts of the spectrum. If a few sections of the spectrum match the target, it would be possible to filter out the undesirable sections and use the limited areas that match the absorption spectrum of the target. Since the filter will be removing a majority of the power, a higher power laser source may be required.

A second type of spectrum modifier is an up-converter or down-converter. This is a material that absorbs light at one frequency and converts it into a different frequency. This differs from a filter in that it can actually take one wavelength and convert it to another. The typical down converter takes in one photon and splits it into exactly two photons of half the energy (longer wavelength). It would be possible to convert a spectrum to shift a spectral component from an unusable frequency into a usable one. This can be combined with filtering either before or after converting.

In one embodiment, the source 20 of radiant energy R is a tunable laser 50 and further comprises a spectrum modifier 60 matching the spectrum of the portion P of the substrate S to be processed. Tunable lasers 50 adjust their emission spectrum by changing the lasing material (gas or liquid).

In one embodiment, the source 20 of radiant energy R is a tunable laser 50 and further comprises a spectrum modifier 60 matching the spectrum of the portion of the substrate to be processed. Tunable lasers adjust their emission spectrum by changing the lasing material (gas or liquid).

In one embodiment, the source 20 of radiant energy R is a $CO_2$ laser 70 and further comprises the spectrum modifier 60 matching the spectrum of the portion P of the substrate S to be processed.

The apparatus 10 further comprises a control system 100 adapted to direct the source 20 of radiant energy R only at the portion P of the substrate S.

With an array of emitting elements, the premise is that the beam is controlled only via intensity as opposed to any spatial controls such as movable lenses or mirrors (i.e., a galvo mirror). The beam intensity can be controlled through switching. There are several approaches to switching. The simplest is PWM (pulse width modulation). The beam is switched on for a short time, then off for a short time. Over the longer time frame, the beam can be viewed as being energized, i.e., 50% of the time and therefore at 50% power. Since solid state lasers can be switched on and off so quickly, this is the most likely approach with a quantum cascade laser. There is also a pulse shaping technology that can be added to the basic switching idea. Basically, one can imagine any power vs. time profile to cause the quantum cascade emitters to create the desired intensity vs. time profile. The quantum cascade laser has a performance limit beyond which the device would be degraded or damaged.

To direct the radiant energy R only at specific portions P of the substrate S to be processed, the substrate S is passed through the path of the beam array. The beam intensity may then be modulated as previously described to deliver the desired amount of energy to only the portion P of the substrate S to be processed. Thus, the beam intensity may be modulated as the substrate S is processed to create the desired energy transfer.

Another approach is to use a galvo control. This approach assumes that the beam is spatially modified. That is, the beam is essentially aimed at the substrate S using a sweeping pattern. The beam spot remains on the target for a short time as the galvo mirror sweeps it along. The beam intensity can also be modulated as the sweep occurs. With this approach, the beam can be shut off or reduced instead of moving the beam quickly to the next target location. With this approach, the galvo and beam intensity can be used in any combination to create the desired energy transfer to the target.

Heat Shrink Tunnel Using Radiant Heat

Figure 2:
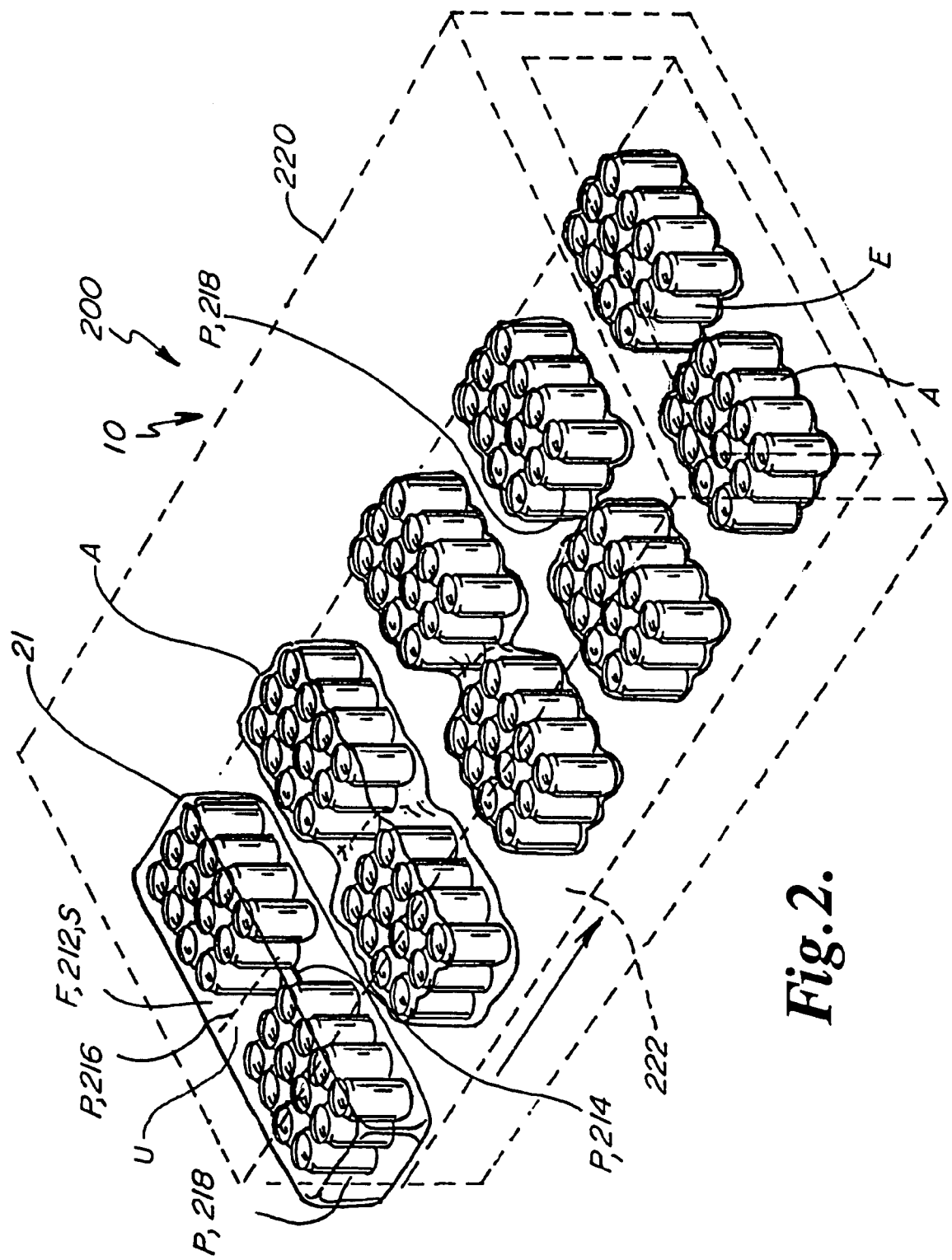
FIG. 2 is a schematic of a sheet of polyethylene shrink film being applied to articles.
Figure 3B:
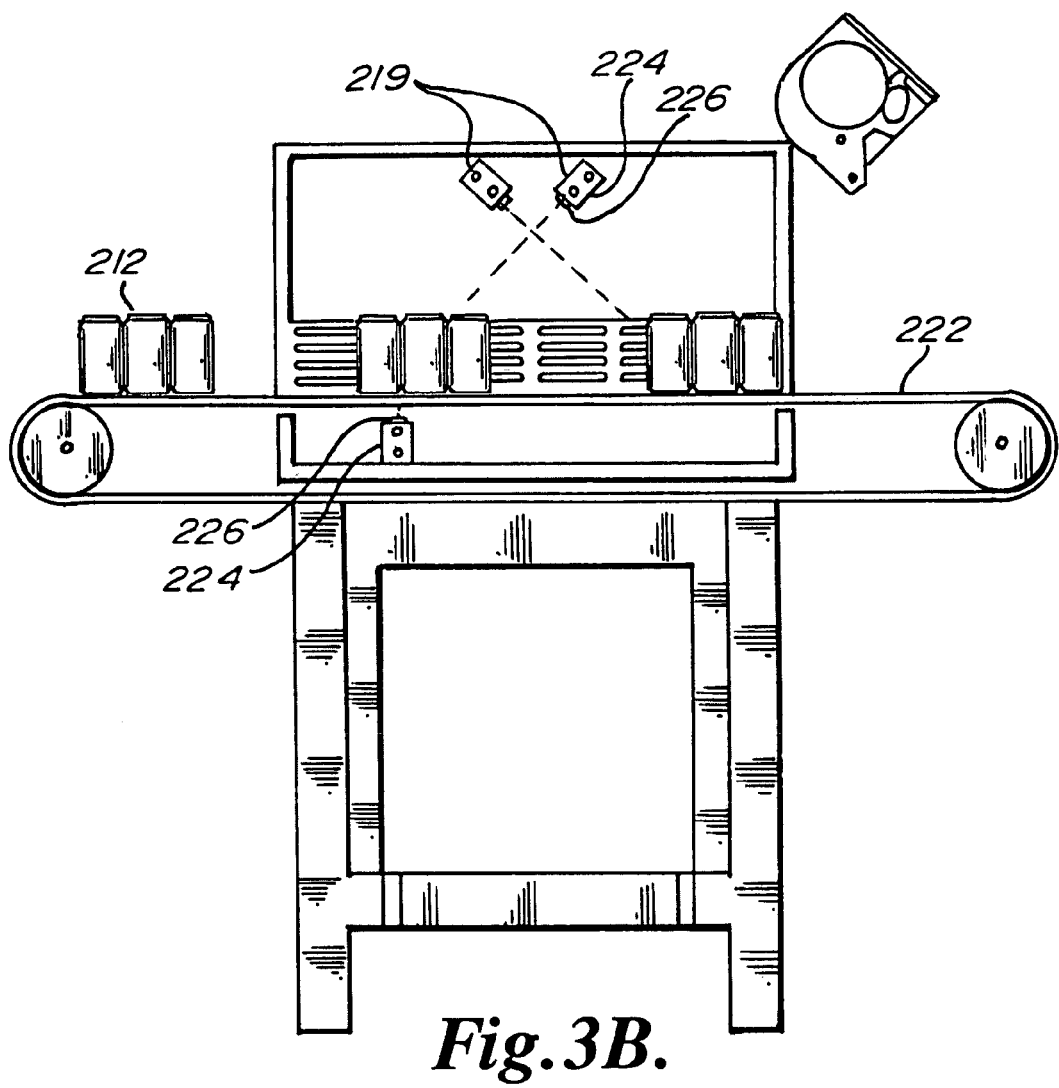
FIG. 3B is a schematic of FIG. 3A showing internal structure.
Figure 3C:
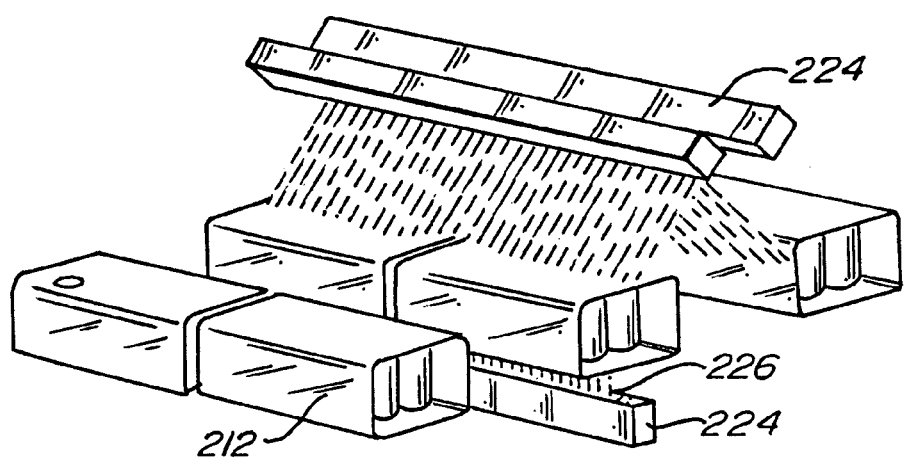
FIG. 3C is a schematic of an emitter bar of the present invention targeting articles to be shrink-wrapped.

In one aspect, the present invention is a heat tunnel 200 for applying radiant heat to articles A to enclose the articles A in shrink-wrap film F. In this aspect of the invention, the substrate S is polyethylene shrink film 212. As shown in FIG. 2, portions P of the polyethylene shrink film 212 are to be processed by the radiant energy R, and other portions U of the polyethylene shrink film 212 are to be substantially unprocessed by the radiant energy R. The portions P consist of specific locations on the polyethylene shrink film 212 selected from the group consisting of weld areas 214, cut areas 216, and shrink areas 218.

As shown in FIGS. 2 and 3A-3D, the heat tunnel 200 further comprises an enclosure 220, a conveyor 222 adapted to move articles A through the enclosure 220, and a source 224 of radiant energy R comprising an emitting element 226 having a customizable wavelength adapted to be configured to be specifically absorbed by the polyethylene shrink film 212 and to be substantially unabsorbed by the enclosure. The heat tunnel 200 further comprises a control system 219 adapted to target the source 224 of radiant energy R at portions P of the polyethylene shrink-wrap film 212 to be heated.

The source 224 of radiant energy R is preferably a quantum cascade laser 228. Most preferably, the source 224 of radiant energy R is an array 230 of quantum cascade lasers 228.

The quantum cascade lasers 228 may also or, alternatively, be configured to emit visible radiation as a guide for alignment and verification of operation.

In this aspect, the customizable wavelength $\lambda_c$ is selected from a group of wavelengths in the infrared spectrum known to be absorbed by polyethylene plastic film 212. For example, but without excluding other wavelengths, the customizable wavelength $\lambda_c$ can be selected from the group consisting of about 3.5, 6.9, 13.6, and 14 microns.

Fusing Roller

In one aspect, as shown in FIGS. 4A-4C, the present invention is an apparatus 300 for fusing toner on a print medium M, such as, but not exclusively limited to, paper. The apparatus comprises a source 324 of radiant energy comprising an emitting element 326 having a customizable wavelength adapted to be configured to be specifically absorbed by the toner T. Preferably, the source 324 of radiant energy is a quantum cascade laser 328. Most preferably, the source 324 is an array 330 of quantum cascade lasers. The apparatus 300 further comprises a control system 319 adapted to target the source 324 of radiant energy at the toner T on portions of the print medium M on which the toner T has been applied to the medium M.

The apparatus further comprises a roller 327. In one embodiment (FIG. 4A) the roller 327 is a transparent roller 327a with a hollow interior 327b, and the array 330 is mounted within the hollow interior 327b. In another embodiment (FIG. 4C), the roller 327 is a transparent roller 327c that is solid, and the array 330 is mounted so as to transmit radiant energy through the roller 327c. In another embodiment (FIG. 4B), the roller 327 is a reflective roller 327d that is solid, and the array 330 is mounted so as to transmit the radiant energy as to reflect from the reflective roller 327d onto the toner T.

The quantum cascade laser 328 is typically configured to emit infrared radiation. Alternatively, the quantum cascade laser 328 may be configured to emit visible radiation as a guide for alignment and verification of operation. Alternatively, the quantum cascade laser 328 may be configured to emit ultraviolet radiation.

Instead of the source of radiant energy being a quantum cascade laser 328, the source 324 of radiant energy may be a tunable laser 332 and further comprises a spectrum modifier 334 matching the spectrum of the toner T. Alternatively, the source 324 of radiant energy may be a $CO_2$ laser 336 and further comprising a spectrum modifier 338 matching the spectrum of the toner T. The toner T may be adapted to absorb the spectrum of the $CO_2$ laser 336.

Reaction Vessel Heater

Figure 5A:
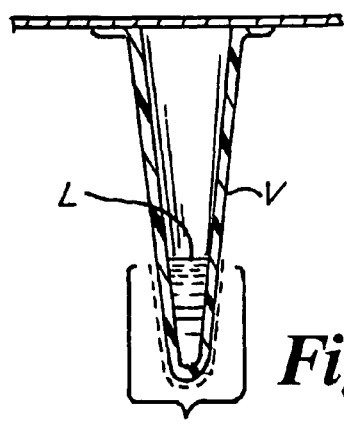
FIG. 5A is a schematic of an apparatus of the present invention used to heat a reaction vessel containing a liquid.
Figure 5B:
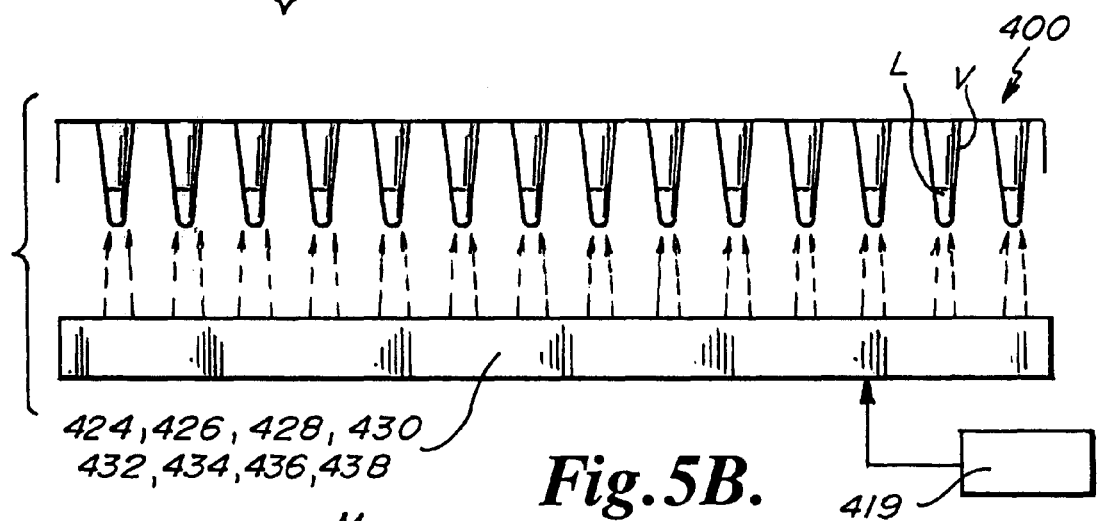
FIG. 5B is a schematic of a reaction vessel of FIG. 5A.

In another aspect, shown in FIGS. 5A-5B, the present invention is an apparatus 400 for heating a reaction vessel V containing a liquid L having deoxyribonucleic acid (DNA) therein.

The apparatus 400 comprises a source 424 of radiant energy comprising an emitting element 426 having a customizable wavelength adapted to be configured to be specifically absorbed by the vessel V and to be substantially not transmitted through the vessel V. The apparatus 400 further comprises a control system 419 adapted to target the source 424 of radiant energy only at portions of the reaction vessel V to be heated.

Preferably, the source 424 of radiant energy is a quantum cascade laser 428. Most preferably, the source 424 is an array 430 of quantum cascade lasers 428.

The quantum cascade laser 428 is typically configured to emit infrared radiation. Alternatively, the quantum cascade laser 428 may be configured to emit visible radiation as a guide for alignment and verification of operation. Alternatively, the quantum cascade laser 428 may be configured to emit ultraviolet radiation.

Instead of the source of radiant energy being a quantum cascade laser, the source 424 of radiant energy may be a tunable laser 432 and further comprises a spectrum modifier 434 matching the spectrum of the reaction vessel. Alternatively, the source of radiant energy 424 may be a $CO_2$ laser 436 and further comprising a spectrum modifier 438 matching the spectrum of the reaction vessel V.

Bottle Pre-Form Temperature Profiling

Figure 6:
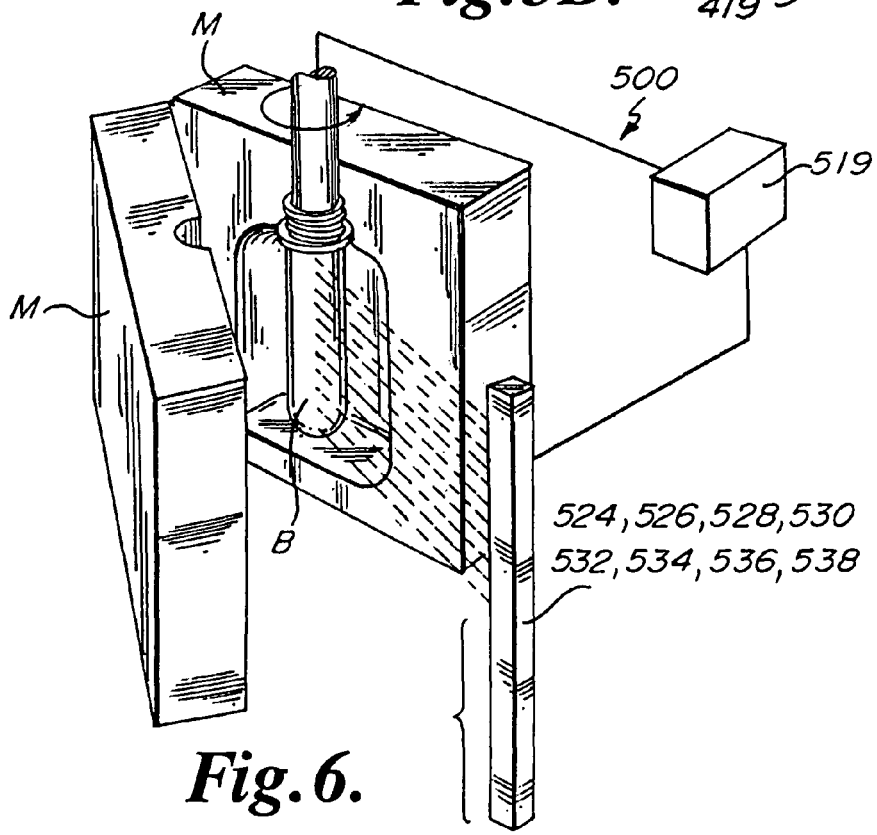
FIG. 6 is a schematic of an apparatus of the present invention used to mold pre-forms into bottles.

In still another aspect, as shown in FIG. 6, the present invention is an apparatus 500 for temperature profiling bottle pre-forms B, comprising: a source 524 of radiant energy comprising an emitting element 526 having a customizable wavelength adapted to be configured to be specifically absorbed by specific areas of the bottle pre-form; and a control system 519 adapted to target the source 524 of radiant energy only at specific areas of the bottle pre-form to be heated.

Preferably, the source 524 of radiant energy is a quantum cascade laser 528. Most preferably, the source 524 is an array 530 of quantum cascade lasers 528.

The quantum cascade laser 528 is typically configured to emit infrared radiation. Alternatively, the quantum cascade laser 528 may be configured to emit visible radiation as a guide for alignment and verification of operation. Alternatively, the quantum cascade laser 528 may be configured to emit ultraviolet radiation.

Instead of the source of radiant energy being a quantum cascade laser 528, the source 524 of radiant energy may be a tunable laser 532 and further comprises a spectrum modifier 534 matching the spectrum of the portion of the bottle pre-form. Alternatively, the source 524 of radiant energy may be a $CO_2$ laser 536 and further comprising a spectrum modifier 538 matching the spectrum of the bottle pre-form B.

The source 524 of radiant energy may be customized to have a wavelength that is slightly different from the absorption spectrum of the bottle pre-form B, thereby allowing a portion of the radiant energy to penetrate into layers below the surface of the bottle pre-form B.

Operation of the various embodiments of the invention will now be described.

Heat Shrink Tunnel Using Radiant Heat

Polyethylene shrink film 212 is placed around the article A to be shrink-wrapped on the conveyor 222. The conveyor 222 then transports the article A and the shrink film 212 into the enclosure. As the article A and shrink film 212 passes under the source 224 of radiant energy R, the control system 219 causes the source 224 of radiant energy R to target the radiant energy R (typically infrared) at only those portions P of the shrink film 212 to be processed. For example, if the shrink film 212 is to be cut, the radiant energy R is targeted at the cut areas 216. If the film 212 is to be welded to itself on the bottom of the article A, the radiant energy R is targeted at the weld areas 214. When the film 212 is to be shrunk around the article A, the radiant energy R is targeted at the shrink areas 218.

Fusing Roller

As directed by the control system 319 (which contains a digital representation of the image to be printed on the medium), the source 324 of radiant energy is targeted only at areas of the print medium M having toner T corresponding to the image. This causes the toner T to be fused to the print medium M.

DNA Reaction Vessel Heating Using Radiant Heat

Under the control of the control system 419 which contains information on the heating sequence, the source 424 of radiant energy is targeted at an array of the vessels V containing the liquid L to be heated.

The array of vessels V is moved across the emitters 426. The radiant heater emitter bar consists of an array 430 of individual radiant energy generators. The spectrum emitted by the generators is customized for maximum absorption into the reaction vessel V and minimal transmission through the vessel V. By limiting the heating to mainly the bottom of the vessel V, the wattage required is greatly reduced. The rest of the vessel V is mostly not heated. The initial heating may act at a high wattage to bring the vessel V up to temperature without overheating the contents. This would be a heating curve based upon the thermodynamic properties of the vessel V. This 'burst' heating at the start will greatly reduce the cycle time and ensure a consistent heat profile applied to the contents of the vessel V.

Some of the samples in the array of vessels V may not require heating or may require heating to a different level depending upon the test being performed on the sample. Each emitter element 426 may use a different heat application profile that is optimized to the test being performed. This removes the need for differing water baths and the associated time spent loading and managing the samples. This will greatly speed up the testing process.

Radiant energy can be focused on the vessel V at high wattages. The rate of heating is not limited by the thermal convection of the water bath.

The testing process can be started immediately. There is no water bath warm up delay.

Bottle Pre-Form Temperature Profiling

Under control of the control system 519, the source 524 of radiant energy directs beams at the bottle pre-form B within a mold M (see FIG. 6).

An array 530 of radiant energy emitters is positioned adjacent to the plastic pre-form B. The pre-form B is rotated. (Rotation via step motor for example.)

The array 530 consists of an array of individual radiant energy emitters 526. The spectrum emitted by the generators is customized for maximum absorption into the plastic forming the pre-form B. The spectrum emitted will not exactly match the absorption spectrum of the plastic. This will allow a fraction of the energy to pass to sub surface material. By closely controlling the spectrum, the energy should be completely absorbed at a 'penetration' depth. This can be optimized to match the wall thickness of the typical pre-form B. This penetration spectrum will allow the pre-form B to be heated much quicker. The initial heating may act at a very high wattage to bring the material of the pre-form B quickly up to an average temperature without overheating the outer surface. The rate of heating is not limited by the thermal conduction of the material of the pre-form B. The delay from heating to molding can be reduced to a very short time.

A stretch rod (not shown) may be used to stretch the pre-form B axially. This may occur before the mold M is closed, allowing a secondary and more accurate heat placement onto the elongated pre-form B.

Each beam is targeted to a small spot at a focal distance. The result is a series of adjacent and slightly overlapping focal points for each beam. Modulating each emitting element 526 controls the exact energy needed to heat the pre-form B at that spot. The pre-form B is rotated to expose the entire circumference to the beams emitted. The beam modulation is varied synchronously with the rotation of the pre-form B such that an exact heat pattern is produced in the pre-form B. An analysis of the wall thickness of test bottles will allow the heat profile to be precisely modified to quickly zero in on an optimal heat profile. This profile can be saved in a computer and recalled for future use. This will provide an exact and repeatable heat profile for many various bottle shapes. The number of unique heating profiles is virtually unlimited. The modulation pattern of the emitting element 526 can be optimized for each bottle type. This will provide better 'customized' heat profiling with highly repeatable results.

The mold is closed and the bottle is blown.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described below. All publications, patent applications, patents, and other references mentioned herein are incorporated by reference in their entirety to the extent allowed by applicable law and regulations. In case of conflict, the present specification, including definitions, will control.

The present invention may be embodied in other specific forms without departing from the spirit or essential attributes thereof, and it is therefore desired that the present embodiments be considered in all respects as illustrative and not restrictive, reference being made to the appended claims rather than to the foregoing description to indicate the scope of the invention.

What is claimed is:

1. Apparatus for selective processing of a substrate using radiant energy, the substrate having a portion to be processed and a larger portion to be substantially unprocessed, the apparatus comprising:
a source of radiant energy comprising an emitting element having a customizable spectrum adapted to be configured to be specifically absorbed by the portion to be processed and to be substantially unabsorbed by the larger portion, wherein the source of radiant energy is a quantum cascade laser; and
a control system adapted to target the source of radiant energy only at the portion of the substrate to be processed.

2. The apparatus of claim 1, wherein the source of radiant energy is an array of quantum cascade lasers.

3. The apparatus of claim 2, wherein the array of quantum cascade lasers is configured to emit infrared radiation.

4. The apparatus of claim 2, wherein the array of quantum cascade lasers is configured to emit visible radiation as a guide for alignment and verification of operation.

5. The apparatus of claim 2, wherein the array of quantum cascade lasers is configured to emit ultraviolet radiation.

6. The apparatus of claim 1, wherein the substrate is polyethylene shrink film.

7. The apparatus of claim 6, wherein the portion to be processed comprises specific locations on the polyethylene shrink film selected from the group consisting of: weld areas, cut areas, and shrink areas.

8. The apparatus of claim 1, wherein the substrate is a print medium and the portion to be processed comprises regions having toner printed thereon.

9. The apparatus of claim 1, wherein the substrate is a reaction vessel containing a liquid to be heated and the portion to be processed comprises a region of the vessel.

10. The apparatus of claim 1, wherein the substrate is a bottle pre-form and the portion to be processed comprises specific areas of the bottle pre-form.

11. A shrink tunnel for applying radiant energy to polyethylene shrink-wrap film to enclose articles in the film, the shrink tunnel comprising:
(a) an enclosure;
(b) a conveyor adapted to move articles through the enclosure;
(c) a source of radiant energy comprising an emitting element having a customizable spectrum adapted to be configured to be specifically absorbed by the polyethylene shrink-wrap film; and
(d) a control system adapted to target the source of radiant energy at portions of the polyethylene shrink-wrap film to be heated, wherein the source of radiant energy further comprises a quantum cascade laser.

12. The shrink tunnel of claim 11, wherein the source of radiant energy further comprises an array of quantum cascade lasers.

13. The shrink tunnel of claim 11, wherein the quantum cascade laser is configured to emit infrared radiation.

14. The shrink tunnel of claim 13, wherein the infrared radiation has a wavelength selected from the group consisting of about 3.5, 6.9, 13.6, and 14 microns.

15. The shrink tunnel of claim 11, wherein the quantum cascade laser is configured to emit visible radiation as a guide for alignment and verification of operation.

16. The shrink tunnel of claim 11 wherein the portion to be processed comprises specific locations on the polyethylene shrink-wrap film selected from the group consisting of weld areas, cut areas, and shrink areas.

17. Method comprising:
providing a quantum cascade laser;
providing a plastic shaped to define a chamber, with the plastic having an absorption spectrum;
radiating the plastic with radiant energy from the quantum cascade laser, with the radiating radiant energy having a spectrum; and
adjusting the spectrum of the radiating radiant energy to match the absorption spectrum of the plastic for minimal transmission of the radiant energy through the plastic to limit heating mainly to the plastic.

18. The method of claim 17 wherein providing the plastic comprises:
providing the plastic in the form of an array of vessels; and
placing samples in the array of vessels; and
wherein radiating the plastic comprises radiating the array of vessels with radiant energy, and wherein adjusting the spectrum comprises adjusting the spectrum of the radiant energy to match the aboserption spectrum of the plastic in the form of the array of vessels and which is substantially not transmitted through the array of vessels.

19. The method of claim 18 further comprising:
targeting the radiant energy radiated to portions of the plastic while other portions of the plastic are substantially unprocessed.

20. The method of claim 17 wherein providing the plastic comprises:
providing the plastic in the form of a bottle pre-form; and
wherein the method further comprises:
blowing the bottle pre-form after being radiated with radiant energy.

21. The method of claim 20 further comprising:
targeting the radiant energy radiated to portions of the plastic while other portions of the plastic are substantially unprocessed.

22. The method of claim 21 wherein providing the plastic comprises:
providing the bottle pre-form having a wall thickness including an outer surface and a subsurface; and
wherein radiating the plastic comprises radiating the bottle pre-form to allow a fraction of the radiant energy to pass to material of the subsurface to avoid overheating the outer surface.

23. The method of claim 2 with providing the quantum cascade laser comprising:
providing an array of quantum cascade lasers.

24. The method of claim 17 wherein adjusting the spectrum comprises adjusting the spectrum of the radiant energy for maximum absorption of the radiant energy into the plastic.

25. The method of claim 24 wherein providing the plastic comprises:
providing an article; and
placing the plastic in the form of film around the article; and
wherein the radiating the plastic comprises shrinking the film on the article to form a package by radiating the article with the film placed therearound with radiant energy of the spectrum which is absorbed by the film.

26. The method of claim 25 further comprising:
targeting the radiant energy radiated to portions of the plastic while other portions of the plastic are substantially unprocessed.

27. The method of claim 26 wherein placing the plastic in the form of film around the article comprises wrapping the film around the article with the film overlapping at a weld area, with radiating the plastic including radiating the weld area of the film with the radiant energy while the other portions of the plastic do not include the weld area.

28. The method of claim 27 wherein radiating the plastic comprises radiating bulls eyes of the package while the other portions of the plastic are located intermediate the bulls eyes of the package.

29. The method of claim 28 wherein providing the article comprises providing at least two spaced apart articles, wherein placing the film comprises placing the film around the at least two spaced apart articles with the film continuously covering adjacent articles and including a junction between adjacent articles, with the method further comprising cutting the film at the junction by radiating the junction with radiant energy.

30. The method of claim 29 wherein placing the film comprises placing polyethylene shrink film around the article.

31. The method of claim 30 wherein radiating the plastic comprises radiating with radiant energy having a wavelength selected from a group consisting of about 3.5, 6.9, and 13.6 to 14 microns.

32. The method of claim 17 wherein adjusting the spectrum comprises adjusting the spectrum of the radiant energy with a portion of the radiant energy penetrating below a surface of the plastic.

* * * * *

UNITED STATES PATENT AND TRADEMARK OFFICE
CERTIFICATE OF CORRECTION

PATENT NO. : 7,823,366 B2  Page 1 of 1
APPLICATION NO. : 11/021976
DATED : November 2, 2010
INVENTOR(S) : Richard Jerome Schoeneck It is certified that error appears in the above-identified patent and that said Letters Patent is hereby corrected as shown below:

Column 8, line 32, cancel "started" and substitute therefore --started,--.

Column 20, line 13, cancel "2" and substitute therefore --22.--.

Signed and Sealed this
Eighth Day of February, 2011

David J. Kappos
*Director of the United States Patent and Trademark Office*